United States Patent
Charron

[15] 3,677,600
[45] July 18, 1972

[54] CAMPER TRAILER

[72] Inventor: Jean Charron, 137 Morel St., Repentigny, Quebec, Canada

[22] Filed: Feb. 22, 1971

[21] Appl. No.: 117,282

[52] U.S. Cl. ................................................296/27, 52/66
[51] Int. Cl. ..............................................................B60p 3/32
[58] Field of Search .....................296/23.2, 27, 23 R; 52/66

[56] References Cited

UNITED STATES PATENTS

| 3,488,085 | 1/1970 | Wallace | 296/27 |
| 3,377,098 | 4/1968 | Bontrager | 296/27 |

*Primary Examiner*—Philip Goodman
*Attorney*—Pierre Lesperance

[57] ABSTRACT

A camper trailer which is collapsible and entirely made of rigid panels. The camper trailer comprises an open top box-like body, a main roof, means to raise the main roof, longitudinal wall panels hinged to the longitudinal sides of said body and, when erected, closing the space between the main roof and the said longitudinal body sides. Extensible parts, entirely made of rigid panels hinged one to the other, can be moved out to protrude from the body and main roof. Each extensible part comprises a horizontal platform mounted on slides, a roof made of panels hinged to the outer end of the platform and to the underside of the main roof and movable in slides under said main roof and of longitudinal panels hinged to the sides of the platform and capable of taking an upright position engaging the roof of the extensible part. The main roof is raised by a system of bars actuated by a winch and cable arrangement.

11 Claims, 9 Drawing Figures

INVENTOR
Jean CHARRON
BY Pierre Lespérance
AGENT

Patented July 18, 1972

INVENTOR
Jean CHARRON
BY Pierre Lespérance
AGENT

INVENTOR
Jean CHARRON
BY Pierre Lesperance
AGENT

INVENTOR
Jean CHARRON
BY
Pierre Lesperance
AGENT

CAMPER TRAILER

The present invention relates to a camper trailer and, more particularly, to such a collapsible camper trailer which is collapsible but is entirely made of rigid panels. The camper trailer, when in collapsed condition, occupies a minimum of room and can be conveniently towed on roadways by a motor vehicle while, when in erected position, provides a large volume for occupancy.

It is known to provide rigid non-collapsible camping trailers. Such camping trailers, because of their greater size than that of the towing vehicle, reduce rear visibility, are not very stable and their great wind resistance results in high fuel consumption of the towing vehicle.

Another type of camping trailer is collapsible with a rigid roof but with flexible walls made of a water-proof fabric. This fabric wears very quickly, tears off and often leaks and is not a very good heat and sound insulator.

I have found that the advantages of the above-noted camping trailer can be preserved while overcoming the above-noted disadvantages by providing a new type of camping trailer. In accordance with the invention, the camping trailer is collapsible but yet completely made of rigid panels which can be folded and retracted to take a collapsed condition and unfolded and erected to take a raised and extended position for occupancy. In the erected position, the camping trailer provided additional space in one or two extendible parts to be used as bed-rooms or for other uses. This additional space is completely enclosed by hinged panels providing roof and wall portions.

The foregoing will become clearer in the annexed description and by referring to the drawings, in which.

In the drawings, like reference characters indicate like elements throughout.

Figure 1:
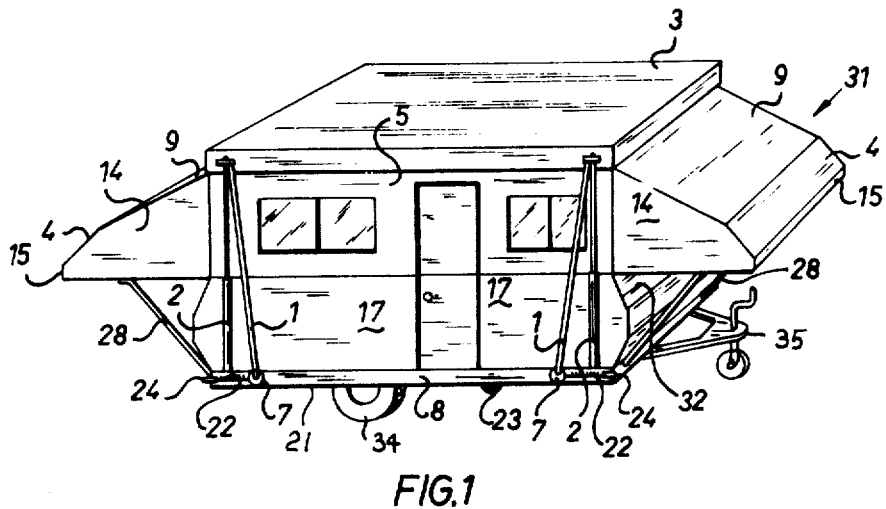
FIG. 1 is a perspective view of the camper trailer in erected position ready for occupancy.
Figure 2:
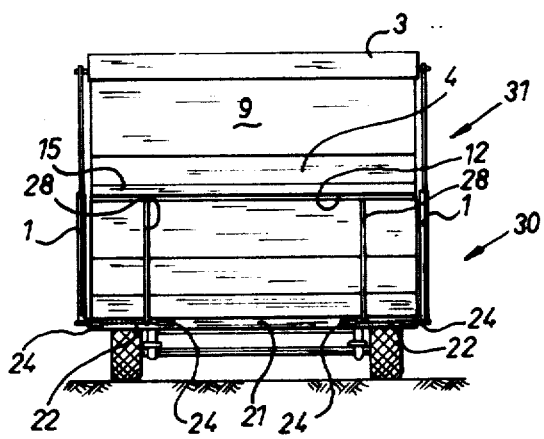
FIG. 2 is a rear end elevation of the camper trailer in erected and extended position.

The camper trailer comprises an open top, box-like body 30, of generally rectangular shape, resting on and secured to a chassis or frame 21 and forming a floor 33, longitudinal walls 17 and end walls 32. Chassis 21 is mounted on a pair of ground-engaging wheels 34 and has a hitch at its front end.

Figure 3:
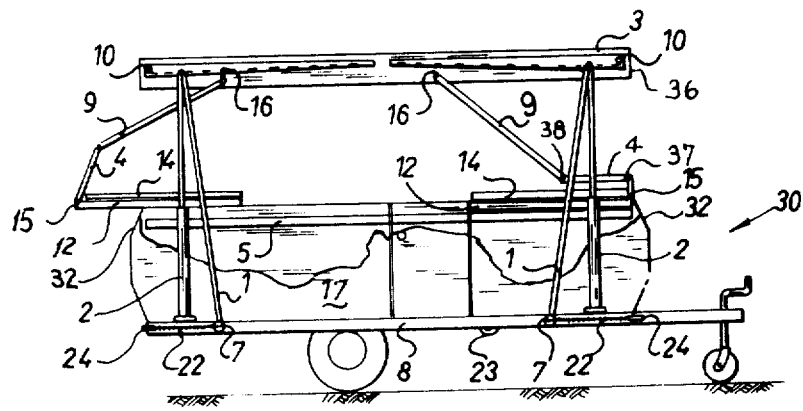
FIG. 3 is a side elevation, partially cut away, of the camper trailer with the main roof in raised position, the extendible left-hand body part in partially retracted position and the extendible right-hand body part in completely retracted position.
Figure 9:
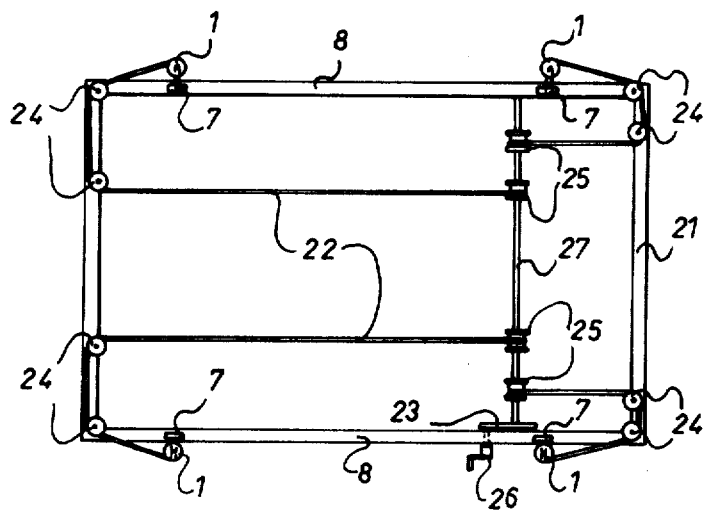
FIG. 9 is a plan view of part of the frame and of the mechanism for raising the main roof.

A rigid rectangular shape main roof 3 is attached to the upper ends of telescopic posts 2 and inclined roof raising rigid bars 1. There is a set of telescopic posts 2 and raising bars 1 for each of the four corners of the main roof 3. The lower ends of the bars 1 are longitudinally movably guided in guides 8 which form part of chassis 21. The lower ends of the bars 1 are provided with a wheel or roller 7 movable in the guide 8. As shown in FIG. 9, a winch and cable system, mounted on chassis 21, serves to move the lower ends of bars 1 towards the respective outer ends of the camper trailer. This system includes cables 22, attached at their outer ends to the bars 1, trained on guiding pulleys 24 and wound on drums 25, secured to a transverse shaft 27 rotatable by a manual crank 26 on the outside of the camper trailer through the intermediary of a transmission 23. Outward movement of the lower bars thus causes raising of the main rigid roof 3 to the fully raised position, as shown in FIG. 3; slackening of cables 22 causes lowering of the main roof, because bars 1 are still inclined in the fully raised position of main roof 3.

Posts 2 stabilize the roof 3 in erected position and also serve to guide the same in its raising and lowering movement. Main roof 3 has a skirt 36 around its entire perimeter, which overlaps the top edge of body 30 in the lowered closed position of roof 3.

Figure 7:
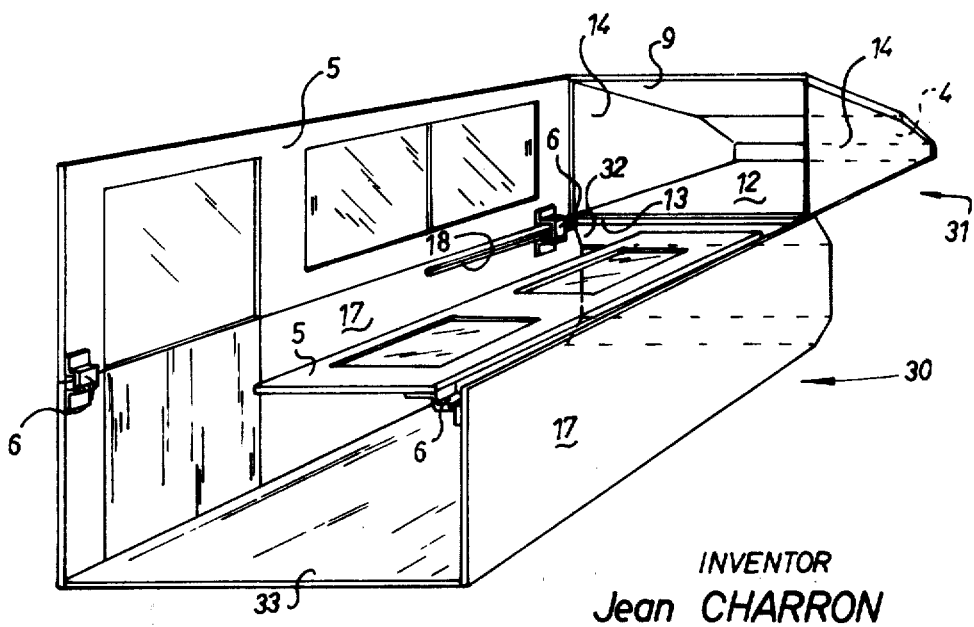
FIG. 7 is a partial perspective view of the camper trailer but in which figure the main roof, one of the extendible body parts and one end of the open top box-like body or casing are not shown.

Longitudinal wall panels 5 are pivoted to the top edge portions of the longitudinal wall 17 by means of hinges 6 having their horizontal pivot lower than the top edge of said longitudinal walls 17, so that the wall panels 5 may be filded inwardly of body 30 in horizontal position, as shown in FIG. 7, such as to be below the level of the top edge of wall 17. Wall panels 5 may be provided with any number of windows and also with the top hinged part of the door for the trailer.

The camper trailer has body parts 31 which are erectable and extendible. Each extendible body part 31 comprises a horizontal platform 12, a roof panel 4 hinged at 37 to an upright end flange 15, secured to the outer end of platform 12. An additional roof panel 9 is hinged at 38 to roof panel 4. Platform 12 is horizontally slidable between retracted position within body 30 over the folded longitudinal wall panels 5 being slidably supported by slide supports 18 secured to the inside of longitudinal walls 17. The platform 12 can be extended to protrude from the ends of box 30 until stop board 13, secured transversely to the underside of the inner end of the platform 12, abuts against the top edge of end body wall 32.

Figure 8:
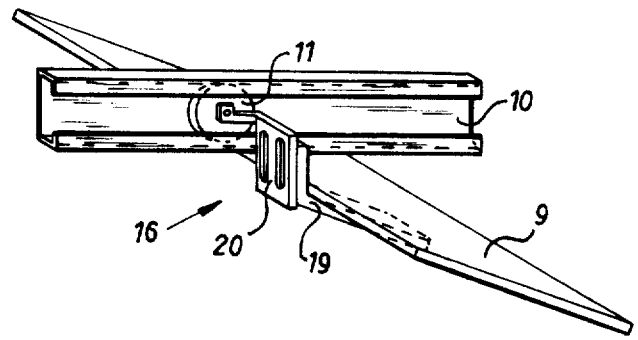
FIG. 8 is a perspective view of the roof panel of one of the extendible body parts and of a guide rail associated therewith for enabling movement of said panel along the main roof.

The top free end of roof panel 9 is provided with a trolley wheel suspension 16 for longitudinal movement with respect to main roof 3. Each wheel suspension 16 comprises an angled bracket 19 (see FIG. 8) rigidly secured to the roof panel 9, to which is adjustably and rigidly secured a plate 20 by means of bolts and nuts, not shown, the bolts passing through elongated slots in plate 20 and in bracket 19. The plate 20 has a side arm carrying a trolley wheel 11 retained in rolling engagement within a channel-shaped guide rail 10 rigidly secured to the underside of main roof 3 and extending longitudinally thereof. The pivot axes of hinges 37 and 38 and of trolley wheels 11 are generally parallel to one another.

Figure 6:
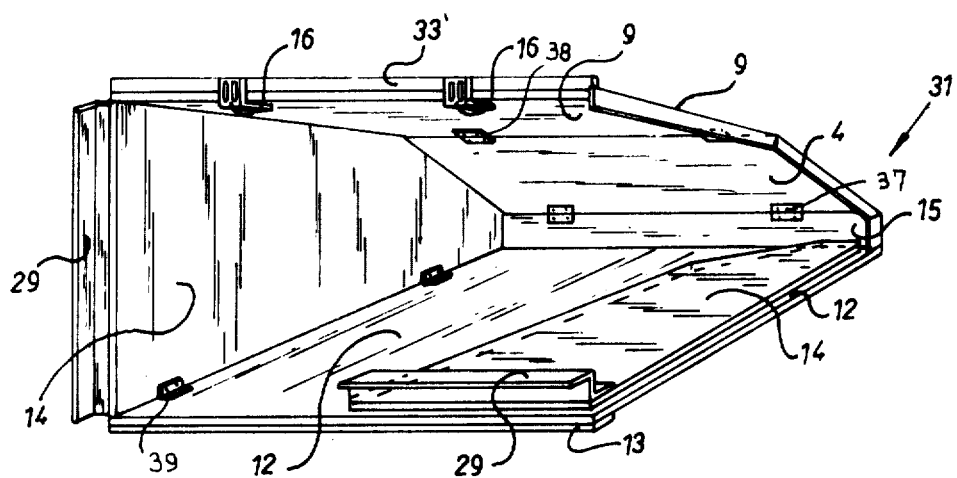
FIG. 6 is a perspective view of one of the end extendible parts.

Generally, triangular side panels 14 are hinged at 39 to the longitudinal edges of platform 12 for movement between a folded position, as shown on the right-hand side of FIG. 6, on top of the platform and in erected vertical position engaging under the roof panels 4 and 9 and conforming to the same and abutting against depending side flanges of said roof panels 4 and 9, as shown on the left-hand side of FIG. 6. The side wall panels 14 are provided with angle irons 29 adapted to engage the outside of the longitudinal wall panels 5 in the erected position of the latter to make a good seal. Similarly, the top edge of roof panel 9 has an upwardly extending flange 33' engageable with the end flange of main roof 3 to make a seal therewith.

Outer end flanges 15 is higher than the thickness of side panels 14, so that when the latter are in folded position over platform 12, the roof panels 4 and 9 may overlie said side panels 14 in horizontal position.

Removable inclined braces 28 (see FIG. 1) serve to support the extended platform 12.

Figure 5:
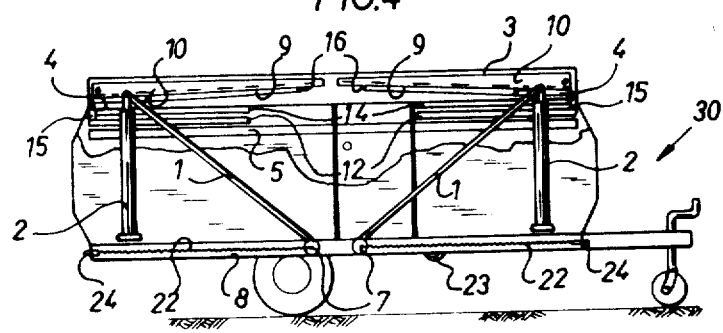
FIG. 5 is a side elevation, partially cut away, as in FIGS. 3 and 4, in completely collapsed condition ready for towing.

In the fully collapsed position, shown in FIG. 5, the skirt of main roof 3 engages and overlies the top edges of body 30 to completely close the latter. The platforms 12 are completely retracted within the box; the panels 14 are folded over the platforms 12 and the roof panels 4 and 9 are resting on side panels 14, while roof panel 9 is still connected to the underside of main roof 3 by means of trolley wheels 11 and guide rails 10. The longitudinal wall panels 5 are folded in horizontal position underneath the retracted platforms.

Figure 4:
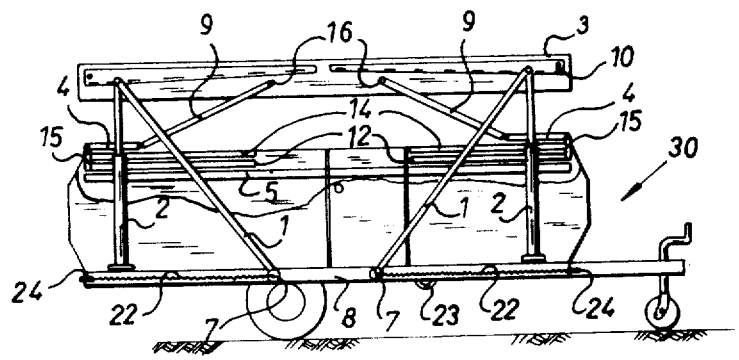
FIG. 4 is a side elevation, partially cut away, similar to that of FIG. 3 but showing the main roof half-raised with the extendible parts in fully retracted position.

To erect the trailer, the main roof 3 is first raised by turning crank 26, whereby the cables 22 pull the wheels 7 and the lower ends of raising bars 1 towards the ends of the trailer camper. This raising movement can be derived from FIGS. 5, 4, and 3. During the roof raising movement, the roof panels 9 of the extendible body parts 31 are also raised, as shown on the right-hand side of FIG. 3. The platforms 12 are then pulled outwardly by hand, these platforms easily sliding on supports 18 until they reach their fully extended position as determined by stop boards 13. Side wall panels 14 are erected to thus cause the roof panels 4 and 9 to take an outwardly protruding angular position, as shown on the left-hand side of FIG. 3, and finally the longitudinal wall panels 5 are unfolded and erected to engage angle irons 29 and the underside of roof 3. Then main roof 3 is slightly lowered to rest on the body wall panels 5 and maintain all of the panels in erected position, the trailer being ready for occupancy. The reverse operation is effected to collapse the camper trailer.

I claim:

1. A collapsible camper trailer comprising a frame, ground-engaging wheels supporting said frame, an open top box-like body secured to said frame and comprising a floor and two pairs of substantially parallel walls, a main roof for said box, means for raising and lowering said main roof and for maintaining the same in raised position, body wall panels hinged to the walls of one of said two pairs of walls for movement between a folded position within said box and an upstanding erected position forming an extension of said walls of said pair of walls and under the raised main roof, and at least one extendible body part movable relative to said body between a retracted position within said body and an advanced position protruding from said main roof and from one wall of said other pair of walls, said extendible body part comprising a platform supported by said body for movement in a plane generally parallel to said floor and having an external end, a roof for said extendible body part comprising first and second rigid roof panels hinged to each other about a first pivot axis, said first roof panel hinged to the external end of said platform about a second pivot axis, said second roof panel having its free ends supported by said main roof for rotation with respect to the latter about a third pivot axis and for movement in a plane generally parallel to the plane of said main roof and in the direction of movement of said extendible body part and side wall panels hinged to the sides of said platform to take an erected position, said first and second roof panels, said first, second and third pivot axes being generally parallel to one another.

2. A camper trailer as claimed in claim 1, wherein guide rails are secured to the underside of the said main roof trolley, wheels engage said guide rails and supports for said trolley wheels are secured to said second panel, said third pivot axes being the axes of rotation of said trolley wheels.

3. A camper trailer as claimed in claim 2, wherein each said support comprises two parts adjustably secured to each other to adjust the distance between said main roof and said second roof panel.

4. A camper trailer as claimed in claim 1, wherein said body wall panels, when in folded position, are at a lower level than the level of said platform, whereby the latter, when in retracted position, is disposed over said folded body wall panels.

5. A camper trailer as claimed in claim 1, wherein said means for raising said main roof comprise rigid roof raising bars located exteriorly of said body and pivoted to said main roof at one end, guide rails secured to said frame and in a plane generally parallel to that of said floor, the other ends of said main roof raising bars being guided in said guide rails for movement in a plane generally parallel to that of said floor.

6. A camper trailer as claimed in claim 5, further including telescopic posts having one section secured to said body and the other section secured to said main roof and serving to stabilize said main roof.

7. A camper trailer as claimed in claim 6, wherein said main roof raising bars are disposed in pairs, each pair arranged on one side of said box, the main roof elevating bars of each pair converging in the direction of their guide rail engaging ends, and further including a manually-operable cable and pulley system for moving said guide rail engaging ends away from each other and thus raise said main roof.

8. A camper trailer as claimed in claim 1, wherein the side wall panels of said extendible body part make an overlap joint with the body wall panels when said side wall panels and said body wall panels are in erected position.

9. A camper trailer as claimed in claim 1, further including removable braces for bracing said platform in advanced position and removably secured to said platform and said body.

10. A camper trailer as claimed in claim 1, wherein said body is of generally rectangular shape when seen in plan view, whereby one pair of body walls are longitudinally extending, whereas the other pair of said body walls are transversely extending with respect to the body, said body wall panels being hinged to said longitudinal body walls and said camper trailer comprising two extendible body parts protruding in their advanced position from the respective transverse body walls.

11. A camper trailer as claimed in claim 1, wherein in the folded position of said body wall panels and in the lowered position of said main roof, said platform is entirely within said body and over said body wall panels, the side wall panels of said extendible body part being folded over said platform in horizontal position and said first and second roof panels overlying said side wall panels, and said main roof covering all of said panels and said platform and directly resting on the sides of said body.

* * * * *